United States Patent
Lin et al.

(10) Patent No.: US 10,606,309 B2
(45) Date of Patent: Mar. 31, 2020

(54) NOTEBOOK COMPUTER

(71) Applicants: INVENTEC (PUDONG) TECHNOLOGY CORPORATION, Shanghai (CN); INVENTEC CORPORATION, Taipei (TW)

(72) Inventors: Chun-Chi Lin, Taipei (TW); I-Ko Song, Taipei (TW); I-Fang Chen, Taipei (TW); Jui Hsiang Chen, Taipei (TW); Chih-Hao Lu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/402,719

(22) Filed: May 3, 2019

(65) Prior Publication Data

US 2020/0042041 A1 Feb. 6, 2020

(30) Foreign Application Priority Data

Aug. 3, 2018 (CN) .......................... 2018 1 0876234

(51) Int. Cl.
*G06F 1/16* (2006.01)
*H01R 13/72* (2006.01)

(52) U.S. Cl.
CPC .......... *G06F 1/1616* (2013.01); *H01R 13/72* (2013.01); *G06F 2200/1633* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,736,332 | A | * | 4/1988 | Crease | G06F 1/1615 361/679.09 |
| 4,803,652 | A | * | 2/1989 | Maeser | G06F 1/1615 345/169 |
| 4,837,590 | A | * | 6/1989 | Sprague | B41J 3/36 190/1 |
| 4,839,837 | A | * | 6/1989 | Chang | G06F 1/1616 346/145 |
| 5,260,884 | A | * | 11/1993 | Stern | G06F 3/0202 361/679.1 |
| 5,305,183 | A | * | 4/1994 | Teynor | B23K 9/1062 211/41.17 |

(Continued)

*Primary Examiner* — Lisa Lea-Edmonds
(74) *Attorney, Agent, or Firm* — Maschoff Brennan

(57) ABSTRACT

The disclosure provides a notebook computer. The notebook computer includes a display assembly and a host assembly. The display assembly includes a first casing and a display panel. The first casing has a first accommodation space. The display panel is located in the first accommodation space. The host assembly includes a second casing, a keyboard base and a keyboard. The second casing has a second accommodation space. The keyboard base is disposed on the second casing and covers the second accommodation space. The keyboard is disposed on the keyboard base, and the first casing is pivotably disposed on the second casing. The first casing is pivotable with respect to the second casing so as to be moved to a closed position. When the first casing is in the closed position, the first casing and the second casing together surround the display panel, keyboard base and keyboard.

14 Claims, 4 Drawing Sheets

(56) References Cited

U.S. PATENT DOCUMENTS

| | | | | |
|---|---|---|---|---|
| 5,345,362 A * | 9/1994 | Winkler | A61N 1/37235 | 248/456 |
| 5,552,957 A * | 9/1996 | Brown | G06F 1/1628 | 346/145 |
| 5,682,993 A * | 11/1997 | Song | A45F 3/02 | 206/320 |
| 5,761,034 A * | 6/1998 | Chu | G06F 1/1613 | 361/679.33 |
| 5,835,344 A * | 11/1998 | Alexander | G06F 1/1628 | 361/679.46 |
| 5,883,820 A * | 3/1999 | Ota | G06F 1/1628 | 361/679.55 |
| 5,992,155 A * | 11/1999 | Kobayashi | G06F 1/203 | 165/104.33 |
| 6,229,698 B1 * | 5/2001 | Harvey | G06F 1/1628 | 206/320 |
| 6,442,018 B1 * | 8/2002 | Dinkin | G06F 1/1628 | 206/305 |
| 6,504,706 B2 * | 1/2003 | Stewart | G06F 1/1616 | 361/679.04 |
| 6,597,568 B2 * | 7/2003 | Ryder | G06F 1/1628 | 206/576 |
| 6,654,235 B2 * | 11/2003 | Imsand | G06F 1/16 | 150/165 |
| 7,002,793 B2 * | 2/2006 | Imsand | G06F 1/16 | 206/320 |
| 7,035,093 B2 * | 4/2006 | Imsand | G06F 1/1601 | 361/679.21 |
| 7,701,709 B2 * | 4/2010 | Tomioka | G06F 1/203 | 165/185 |
| 7,719,831 B2 * | 5/2010 | Fujiwara | G06F 1/203 | 165/104.21 |
| 7,778,026 B2 * | 8/2010 | Mitchell | A45C 9/00 | 206/522 |
| 8,089,753 B2 * | 1/2012 | Dotson | A45C 11/00 | 165/122 |
| 8,687,362 B2 * | 4/2014 | Zhao | G06F 1/1628 | 312/223.1 |
| 8,804,327 B2 * | 8/2014 | Al-Khayyat | G06F 1/1696 | 361/679.09 |
| 2002/0145847 A1 * | 10/2002 | Crosby | F16M 11/10 | 361/679.02 |
| 2004/0264126 A1 * | 12/2004 | Wells | G06F 1/203 | 361/679.46 |
| 2007/0258204 A1 * | 11/2007 | Chang | G06F 1/1616 | 361/679.4 |
| 2008/0055828 A1 * | 3/2008 | Yang | G06F 1/1616 | 361/679.09 |

\* cited by examiner

NOTEBOOK COMPUTER

CROSS-REFERENCE TO RELATED APPLICATIONS

This non-provisional application claims priority under 35 U.S.C. § 119(a) on Patent Application No(s). 201810876234.0 filed in China on Aug. 3, 2018 the entire contents of which are hereby incorporated by reference.

BACKGROUND OF THE INVENTION

Technical Field of the Invention

The disclosure relates to a notebook computer, more particularly to a notebook computer having a display assembly and a host assembly that both have a casing.

Description of the Related Art

As computer technology progresses, electronic devices, such as computers or communication device, have been developed to be portable such that these devices can be carried to difference places.

To a laptop computer, the laptop computer is usually stored in a laptop bag to obtain protection from scratches or impacts. Therefore, when the user needs to carry the laptop computer to go to another place, the user has to store the laptop computer into the laptop bag and then take the laptop computer out of the laptop bag.

SUMMARY OF THE INVENTION

One embodiment of the disclosure provides a notebook computer. The notebook computer includes a display assembly and a host assembly. The display assembly includes a first casing and a display panel. The first casing has a first accommodation space. The display panel is located in the first accommodation space. The host assembly includes a second casing, a keyboard base and a keyboard. The second casing has a second accommodation space. The keyboard base is disposed on the second casing and covers the second accommodation space. The keyboard is disposed on the keyboard base, and the first casing is pivotably disposed on the second casing. The first casing is pivotable with respect to the second casing so as to be moved to a closed position. When the first casing is in the closed position, the first casing and the second casing together surround the display panel, keyboard base and keyboard.

BRIEF DESCRIPTION OF THE DRAWINGS

The present disclosure will become more fully understood from the detailed description given hereinbelow and the accompanying drawings which are given by way of illustration only and thus are not limitative to the present disclosure and wherein.

DETAILED DESCRIPTION

Figure 1:
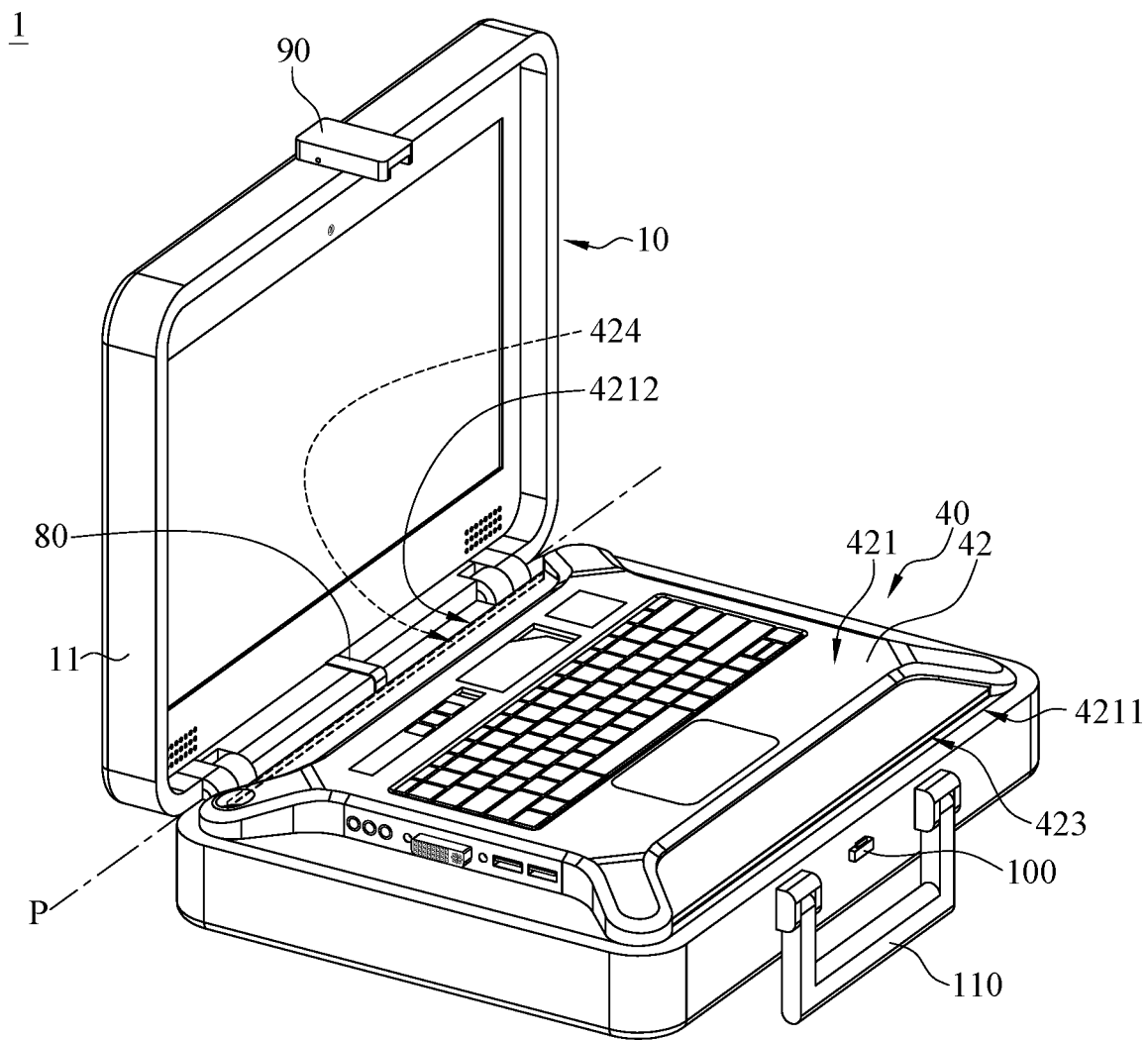
FIG. 1 is a perspective view of a notebook computer according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the figures, and some practical details are described in the following paragraphs, but the present disclosure is not limited thereto. Furthermore, for the purpose of illustration, some of the structures and components in the figures are simplified, and wires, reference lines or buses are omitted in some of the figures.

Moreover, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
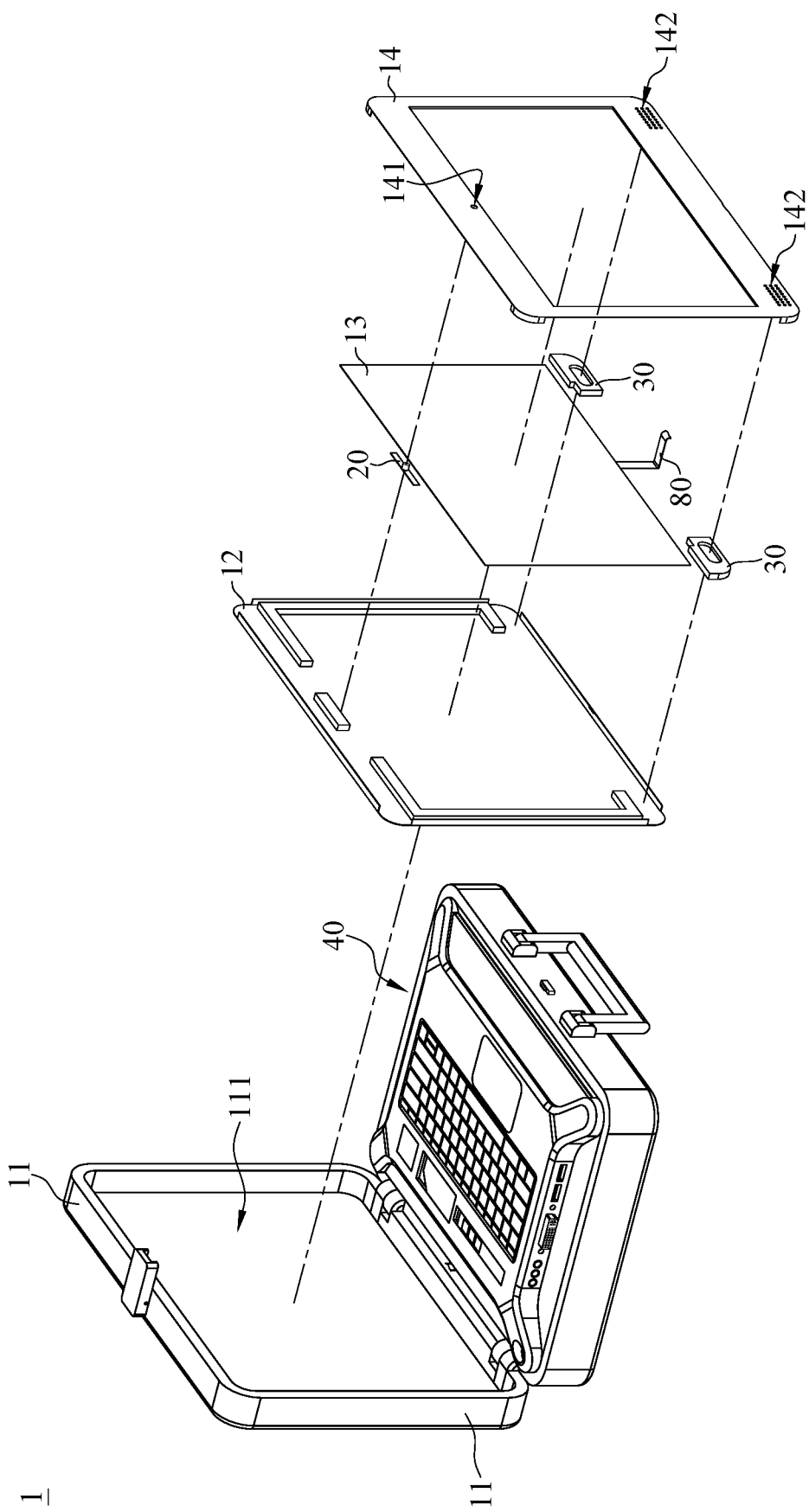
FIG. 2 is a partial exploded view of the notebook computer in FIG. 1.
Figure 3:
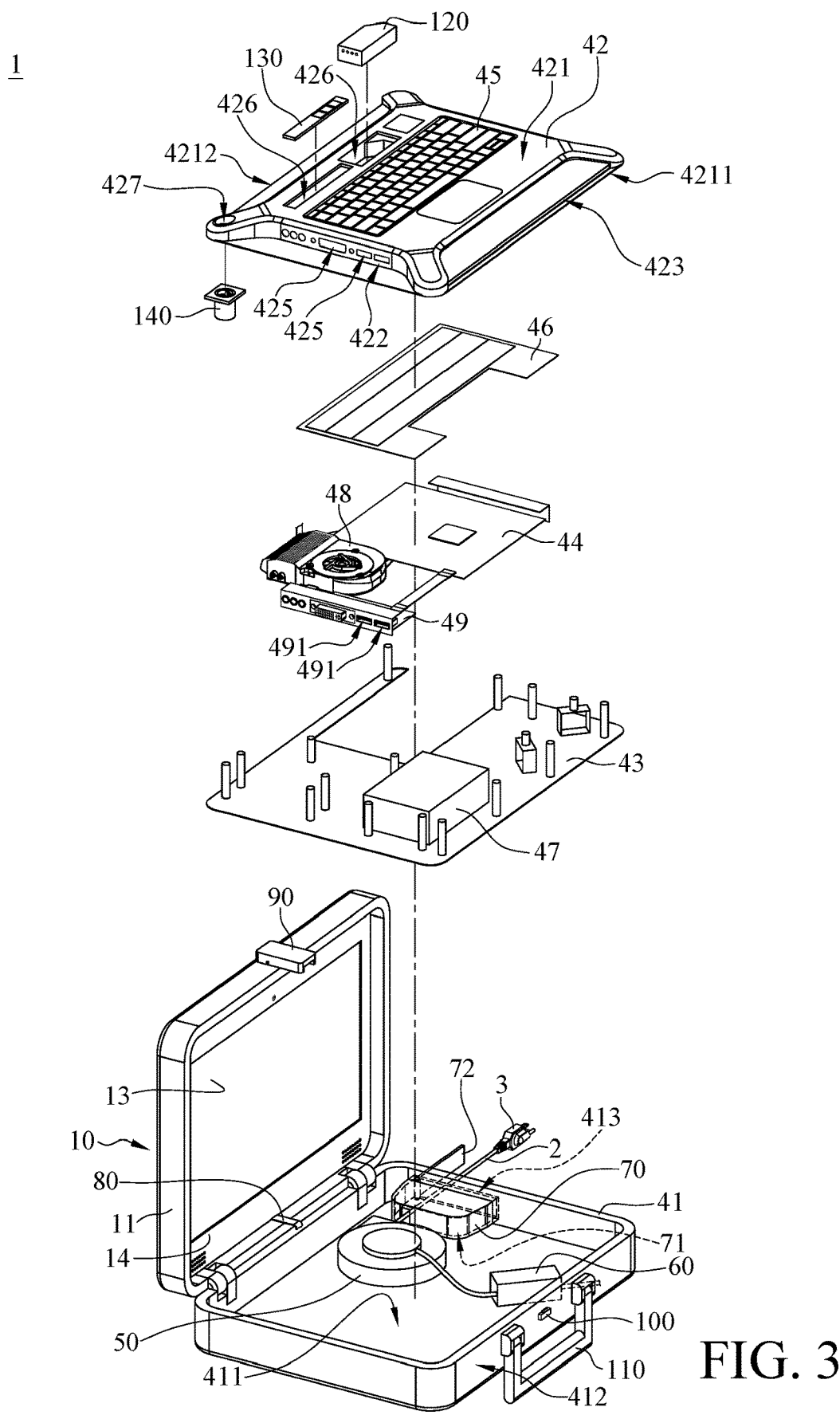
FIG. 3 is another partial exploded view of the notebook computer in FIG. 1.

Please refer to FIG. 1 to FIG. 3. FIG. 1 is a perspective view of a notebook computer according to a first embodiment of the disclosure. FIG. 2 is a partial exploded view of the notebook computer in FIG. 1. FIG. 3 is another partial exploded view of the notebook computer in FIG. 1.

This embodiment provides a notebook computer 1. The notebook computer 1 is also known as a laptop computer. The notebook computer 1 includes a display assembly 10, an image capturing assembly 20, two speakers 30, a host assembly 40, a cable winder 50, a power supply device 60 and a storage box 70.

The display assembly 10 includes a first casing 11, an assembling plate 12, a display panel 13 and a frame 14. The first casing 11 has a first accommodation space 111. The assembling plate 12, the display panel 13 and the frame 14 are located in the first accommodation space 111. The display panel 13 is fixed on the assembling plate 12, and the frame 14 surrounds the display panel 13 and is fixed to the assembling plate 12.

The frame 14 of the display assembly 10 has a camera hole 141 and two speaker holes 142. The image capturing assembly 20 and the two speakers 30 are disposed between the frame 14 and the assembling plate 12 and are located aside the display panel 13. The image capturing assembly 20 corresponds to the camera hole 141, and the two speaker 30 respectively correspond to the two speaker holes 142. The image capturing assembly 20 is, for example, a webcam. The image capturing assembly 20 can capture the images around the notebook computer 1 via the camera hole 141, and the two speakers 30 can produce sound and transmit it through the two speaker holes 142.

The quantities of the speaker holes 142 and the speakers 30 are not restricted. In some other embodiments, the quantities of the speaker hole and the speaker may both be less than or greater than two. In addition, the image capturing assembly may be optional; in some other embodiments, the notebook computer may have no image capturing assembly.

The host assembly 40 includes a second casing 41, a keyboard base 42, a fixing plate 43, a motherboard 44, a keyboard 45, a support component 46 and a battery 47.

The first casing 11 is pivotably disposed on the second casing 41. The second casing 41 has a second accommodation space 411. The keyboard base 42 covers the second accommodation space 411. The fixing plate 43 is disposed in the second accommodation space 411, and the motherboard 44 is fixed on the fixing plate 43 and located at a side of the fixing plate 43 facing the keyboard base 42. The keyboard 45 is disposed on the keyboard base 42 and electrically connected to the motherboard 44, and the support component 46 is disposed on a side of the keyboard base 42 facing the second accommodation space 411. In detail, the support component 46 is disposed between the motherboard 44 and the keyboard base 42 and is configured to support the keyboard 45. The battery 47 is fixed on the fixing plate 43 and located at a side of the fixing plate 43 facing the keyboard base 42. The battery 47 is electrically connected to the motherboard 44.

In this embodiment, the keyboard base 42 has a top surface 421, a lateral surface 422, an air inlet 423, an air outlet 424 and a plurality of insert holes 425. The top surface 421 is located at a side of the keyboard base 42 facing away from the second accommodation space 411. The lateral surface 422 and the top surface 421 are connected to each other, and the lateral surface 422 and the top surface 421 face two different directions. The air inlet 423 and the air outlet 424 are located at the top surface 421, and the insert holes 425 are located at the lateral surface 422. The top surface 421 has a first side 4211 and a second side 4212 that are located opposite to each other. The second side 4212 is located closer to a pivot axis P of the first casing 11 than the first side 4211. The air inlet 423 is located close to the first side 4211, and the air outlet 424 is located close to the second side 4212.

In addition, the host assembly 40 further includes a fan 48 and an expansion card 49. The fan 48 is fixed on a side of the fixing plate 43 facing the keyboard base 42. The fan 48 is configured to suck external air into the second accommodation space 411 from the air inlet 423 and blow internal air in the second accommodation space 411 out of the second accommodation space 411 from the air outlet 424. The expansion card 49 is located in the second accommodation space 411 and electrically connected to the motherboard 44. The expansion card 49 has a plurality of expansion ports 491. The expansion ports 491 respectively correspond to the insert holes 425. In this embodiment, the expansion ports 491 are, for example, USB-type sockets.

Moreover, the second casing 41 further has a side wall 412 and an opening 413. The opening 413 is located at the side wall 412 and connected to the second accommodation space 411. The cable winder 50 and the power supply device 60 are disposed in the second accommodation space 411, and the power supply device 60 is electrically connected to the motherboard 44. Two opposite ends of the storage box 70 are respectively disposed on the cable winder 50 and the opening 413 of the second casing 41. The storage box 70 has a storage space 71 and a cover 72. The cover 72 is switchable to cover or expose the storage space 71. The cable winder 50 is configured to wind a cable 2 which is connected to the power supply device 60, and the storage space 71 of the storage box 70 is configured to store a plug 3 which is connected to the cable 2. When the notebook computer 1 is in use or the battery 47 of the notebook computer 1 is required to be charged, the cover 72 of the storage box 70 can be opened to allow the plug 3 and the cable 2 to be pulled out for connecting to an external power source such that the external power source provides electricity to the notebook computer 1 or charges the battery 47. Otherwise, the cable 2 can be stored in the cable winder 50, and the plug 3 can be stored in the storage box 70.

In this embodiment, the display panel 13, the image capturing assembly 20 and the speakers 30 are electrically connected to the motherboard 44 via, for example, wires. In addition, the notebook computer 1 further includes a soft pipe 80. One end of the soft pipe 80 is disposed through the keyboard base 42, and the other end of the soft pipe 80 extends to the frame 14 located in the first accommodation space 111 so as to connect the first accommodation space 111 to the second accommodation space 411. The soft pipe 80 is configured to protect the wires connected among the display panel 13, the image capturing assembly 20, the speaker 30 and the motherboard 44. Thus, when the first casing 11 is pivoted with respect to the second casing 41, the soft pipe 80 ensures the qualities of the electrical connections between the motherboard 44 and the display panel 13, the image capturing assembly 20 and the speaker 30, thereby maintaining the functions of the display panel 13, the image capturing assembly 20 and the speakers 30.

Furthermore, the notebook computer 1 further includes a first fixing component 90, a second fixing component 100 and a handle 110. The first fixing component 90 is disposed on the first casing 11, and the second fixing component 100 and the handle 110 are disposed on the side wall 412 of the second casing 41. The first fixing component 90 and the second fixing component 100 are, for example, any suitable types of fasteners that can be engaged to each other.

Figure 4:
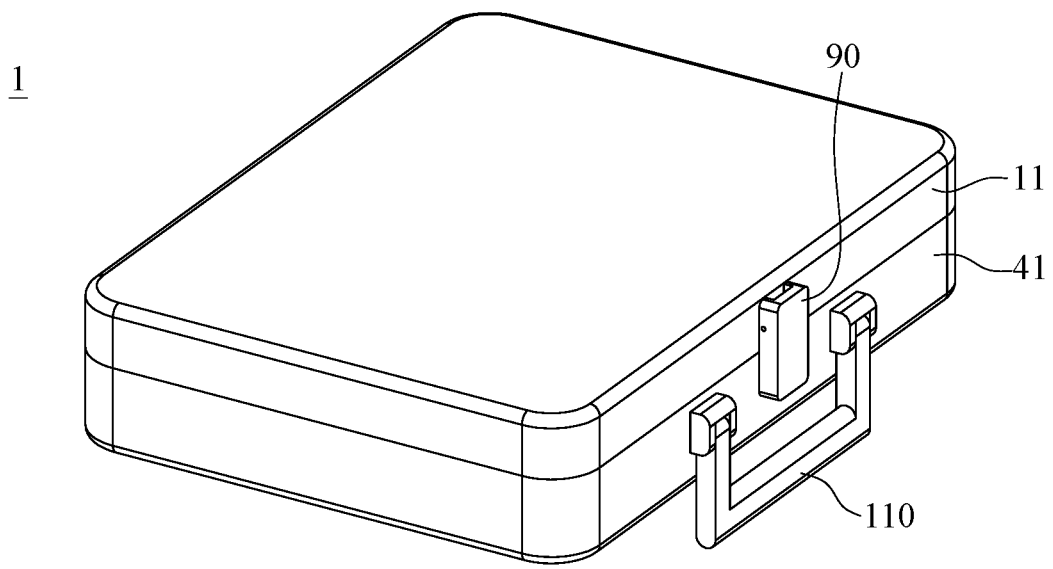
FIG. 4 is a perspective view of the notebook computer in FIG. 1 when the first casing is in a closed position.

Then, please refer to FIG. 3 and further refer to FIG. 4. FIG. 4 is a perspective view of the notebook computer in FIG. 1 when the first casing is in a closed position. The first casing 11 is pivotable with respect to the second casing 41 so that the first casing 11 is able to be moved to a closed position. When the first casing 11 is in the closed position, the first casing 11 and the second casing 41 together surround the display panel 13, the frame 14, the keyboard base 42, and the keyboard 45 in order to provide a certain level of protection to them. Thus, it is unnecessary to put the notebook computer 1 in a laptop bag to get more protection. As a result, when a user needs to change places to use the notebook computer 1, the notebook computer 1 can be directly carried away without being stored in the laptop bag, which is convenient and handy for the user. Also, the first fixing component 90 and the second fixing component 100 can be engaged with each other to fix the first casing 11 and the second casing 41 in place. Moreover, the user is able to carry the notebook computer 1 by holding the handle 110, and the handle 110 gives the notebook computer 1 a suitcase look.

Furthermore, the materials of the first casing 11 and the second casing 41 may be aluminum. This may make the notebook computer 1 look like a high quality suitcase. On the other hand, when the first casing 11 is opened, the notebook computer 1 may give the overall design a novel and modern look. As such, it is not only consumers attractive but also improves the user experience of the notebook computer 1.

In this embodiment, since the keyboard base 42 has the air inlet 423 and the air outlet 424, the fan 48 is still able to dissipate heat from the notebook computer 1 even if the second casing 41 has no hole. Therefore, it is possible to meet the requirement of heat dissipation while keeping the completeness of the notebook computer 1.

The notebook computer 1 not only has a novel appearance, but also can be cooperated with peripheral devices. In detail, as shown in FIG. 3, the notebook computer 1 further includes a wireless microphone 120 and a remote controller 130, and the keyboard base 42 has two charging recesses 426 which are located at the top surface 421. The wireless microphone 120 and the remote controller 130 are respectively and removably placed in the two charging recesses 426 and electrically connected to the motherboard 44 via pins located in the charging recesses 426 or in a wireless manner. In this embodiment, the wireless microphone 120 and the remote controller 130 are respectively fixed in the charging recesses 426 via, for example, a magnetic attraction manner. In addition, in a circumstance such as a presentation, the wireless microphone 120 can be connected to an external speaker for voice amplification, and the remote controller 130 can be taken as a presentation pointer to operate a slideshow on the notebook computer 1 and/or create a light indication to interact with audiences. When the wireless microphone 120 and the remote controller 130 are not in use, they can be placed back to the charging recesses 426 for charging.

However, the wireless microphone 120 and the remote controller 130 may be optional. In some other embodiments, the notebook computer may only have either the wireless microphone or the remote controller, or may neither have the wireless microphone nor the remote controller.

In addition, the notebook computer 1 further includes a socket 140, and the keyboard base 42 has a through hole 427. The socket 140 is disposed at the through hole 427, and part of the socket 140 is located in the second accommodation space 411. The socket 140 is electrically connected to the motherboard 44. The socket 140 is, for example, suitable for an audio cable which is XLR format. This allows the notebook computer 1 to be connected to an external speaker via the audio cable for audio amplification.

According to the notebook computer as discussed above, when the first casing is in the closed position, the first casing and the second casing together surround and protect the display panel, the frame, the keyboard base and the keyboard. Thus, it is unnecessary to put the notebook computer in a laptop bag to get more protection. As a result, when a user needs to change places to use the notebook computer, the notebook computer can be directly carried away without being stored in the laptop bag, which is convenient and handy for the user.

Also, the first fixing component and the second fixing component can be engaged with each other to fix the first casing and the second casing in place. Moreover, the user is able to carry the notebook computer by holding the handle, and the handle gives the notebook computer a suitcase look.

Furthermore, the materials of the first casing and the second casing may be aluminum. This may make the entire notebook computer has a high quality, novel and modern look no matter the first casing is opened or closed.

Since the keyboard base has the air inlet and the air outlet, the fan is still able to dissipate heat from the notebook computer even if the second casing has no hole. Therefore, it is possible to meet the requirement of heat dissipation while keeping the completeness of the notebook computer.

The wireless microphone and the remote controller can be placed and charged in the charging recesses of the keyboard base. In addition, the wireless microphone and the remote controller can be used in a presentation. Moreover, the socket allows the notebook computer to be connected the external speaker for audio amplification via the audio cable.

In addition, the cable winder and the storage box can respectively store the cable and the plug when the notebook computer is not in use.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A notebook computer, comprises:
a display assembly comprising a first casing and a display panel, wherein the first casing has a first accommodation space, and the display panel is located in the first accommodation space; and
a host assembly comprising a second casing, a keyboard base and a keyboard, wherein the second casing has a second accommodation space, the keyboard base is disposed on the second casing and covers the second accommodation space, the keyboard is disposed on the keyboard base, and the first casing is pivotably disposed on the second casing;
wherein the first casing is pivotable with respect to the second casing so as to be moved to a closed position; when the first casing is in the closed position, the first casing and the second casing together surround the display panel, the keyboard base and the keyboard;
wherein the display assembly further comprises a frame, and the frame is located in the first accommodation space and surrounds the display panel.

2. The notebook computer according to claim 1, further comprising a cable winder and a power supply device, wherein the second casing further has a side wall and an opening, the opening is located at the side wall and connected to the second accommodation space, the cable winder and the power supply device are disposed in the second accommodation space, and the cable winder corresponds to the opening and is configured to wind a cable connected to the power supply device.

3. The notebook computer according to claim 2, further comprising a storage box, wherein two opposite ends of the storage box are respectively disposed on the cable winder and the opening of the second casing, the storage box has a storage space and a cover, the storage space of the storage box is configured to store a plug connected to the cable, and the cover is switchable to cover or expose the storage space.

4. The notebook computer according to claim 1, wherein the host assembly further comprises a fixing plate, a motherboard and a battery, the fixing plate, the motherboard and the battery are located in the second accommodation space, the motherboard and the battery are fixed on the fixing plate, and the battery, the display panel and the keyboard are electrically connected to the motherboard.

5. The notebook computer according to claim 1, further comprising a wireless microphone, wherein the keyboard base has a charging recess, and the wireless microphone is removably disposed in the charging recess.

6. The notebook computer according to claim 1, further comprising a remote controller, wherein the keyboard base has a charging recess, and the remote controller is removably disposed in the charging recess.

7. The notebook computer according to claim 1, wherein the host assembly further comprises a fan, the fan is located in the second accommodation space, the keyboard base has an air inlet and an air outlet, and the air inlet and the air outlet are connected to the second accommodation space.

8. The notebook computer according to claim 1, further comprising a socket, wherein the keyboard base has a through hole, the socket is disposed at the through hole, and part of the socket is located in the second accommodation space.

9. The notebook computer according to claim 1, wherein the keyboard base has a plurality of insert holes, the host assembly further comprises an expansion card, the expansion card is located in the second accommodation space, the expansion card has a plurality of expansion ports, and the plurality of expansion ports respectively correspond to the plurality of insert holes.

10. The notebook computer according to claim 1, wherein the host assembly further comprises a support component, and the support component is located at a side of the keyboard base facing the second accommodation space.

11. The notebook computer according to claim 1, further comprising a first fixing component, a second fixing component and a handle, wherein the first fixing component is disposed on the first casing, the second fixing component and the handle are disposed on the second casing; when the first casing is in the closed position, the first fixing component is configured to be engaged with the second fixing component.

12. The notebook computer according to claim 1, further comprising a soft pipe, wherein one end of the soft pipe is disposed through the keyboard base, and another end of the soft pipe extends to the first accommodation space so as to connect the first accommodation space to the second accommodation space.

13. The notebook computer according to claim 1, wherein the display assembly further comprises an assembling plate, the assembling plate is located in the first accommodation space, and the display panel is fixed on the assembling plate.

14. The notebook computer according to claim 1, further comprising a speaker and an image capturing assembly, wherein the speaker and the image capturing assembly are disposed aside the display panel.

* * * * *